(12) United States Patent
Sharp et al.

(10) Patent No.: US 9,354,933 B2
(45) Date of Patent: May 31, 2016

(54) REMOTE DIRECT MEMORY ACCESS ADAPTER STATE MIGRATION IN A VIRTUAL ENVIRONMENT

(75) Inventors: Robert O. Sharp, Round Rock, TX (US); Kenneth G. Keels, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/285,299

(22) Filed: Oct. 31, 2011

(65) Prior Publication Data

US 2013/0110959 A1    May 2, 2013

(51) Int. Cl.
*G06F 15/167* (2006.01)
*G06F 9/50* (2006.01)

(52) U.S. Cl.
CPC .................................. *G06F 9/5016* (2013.01)

(58) Field of Classification Search
CPC . G06F 9/45558; G06F 13/28; G06F 9/45533;
G06F 2009/45579; G06F 9/4856; G06F
2009/45583; G06F 9/5077; G06F 9/546;
G06F 13/4022; G06F 2009/4557; G06F
9/45537; G06F 9/5016; G06F 12/0246
USPC ......................................................... 709/21 D
See application file for complete search history.

(56) References Cited

U.S. PATENT DOCUMENTS

| | | | |
|---|---|---|---|
| 7,370,174 B2* | 5/2008 | Arizpe et al. | 711/206 |
| 7,480,742 B2* | 1/2009 | Arndt et al. | 710/8 |
| 7,577,764 B2* | 8/2009 | Arndt et al. | 710/8 |
| 7,702,826 B2* | 4/2010 | Oztaskin et al. | 710/26 |
| 7,756,943 B1 | 7/2010 | Wong | |
| 7,987,469 B2* | 7/2011 | Magro et al. | 719/314 |
| 8,055,818 B2* | 11/2011 | Craddock et al. | 710/54 |
| 8,274,518 B2* | 9/2012 | Blythe | 345/522 |
| 8,281,013 B2* | 10/2012 | Mundkur et al. | 709/226 |
| 2006/0236063 A1* | 10/2006 | Hausauer et al. | 711/170 |
| 2007/0162641 A1 | 7/2007 | Oztaskin et al. | |
| 2008/0148281 A1 | 6/2008 | Magro et al. | |
| 2010/0083247 A1 | 4/2010 | Kanevsky et al. | |
| 2010/0303799 A1* | 12/2010 | Schmid-Schonbein et al. | 424/94.64 |
| 2011/0179415 A1* | 7/2011 | Donnellan et al. | 718/1 |

FOREIGN PATENT DOCUMENTS

| | | |
|---|---|---|
| KR | 10-2010-0043006 A | 4/2010 |
| WO | 2013/066572 A2 | 5/2013 |

OTHER PUBLICATIONS

International Search Report and Written Opinion received for PCT Application No. PCT/US2012/059241, mailed on Mar. 13, 2013, 10 pages.

* cited by examiner

*Primary Examiner* — Douglas W Owens
*Assistant Examiner* — Monica C King
(74) *Attorney, Agent, or Firm* — Barnes & Thornburg LLP

(57) ABSTRACT

In an embodiment of the present invention, a method includes partitioning a plurality of remote direct memory access context objects among a plurality of virtual functions, establishing a remote direct memory access connection between a first of the plurality of virtual functions, and migrating the remote direct memory access connection from the first of the plurality of virtual functions to a second of the plurality of virtual functions without disconnecting from the remote peer.

6 Claims, 5 Drawing Sheets

METHOD 300

REMOTE DIRECT MEMORY ACCESS ADAPTER STATE MIGRATION IN A VIRTUAL ENVIRONMENT

FIELD

Embodiments of this invention relate to RDMA (remote direct memory access) data transfer in a virtual environment.

BACKGROUND

Traditional RDMA allows data to move directly from one computer system into the memory of another without involving either one's CPU (central processing unit), and specifically, either one's operating system, during the data transfer. This permits high-throughput, low-latency networking by eliminating the need to copy data between application memory and the data buffers in the operating system.

A virtual computing environment refers to a computer system in which a single physical machine may be observed as multiple virtual machines, and where a set of physical hardware resources can be used as multiple virtual resources. Each virtual machine (VM) can run its own operating system that may control the set of virtual hardware resources.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples are described in detail, or where one or more examples are provided, it should be understood that the examples are not to be construed as exhaustive, and embodiments of the invention are not to be limited to the examples described and/or illustrated.

Figure 1:
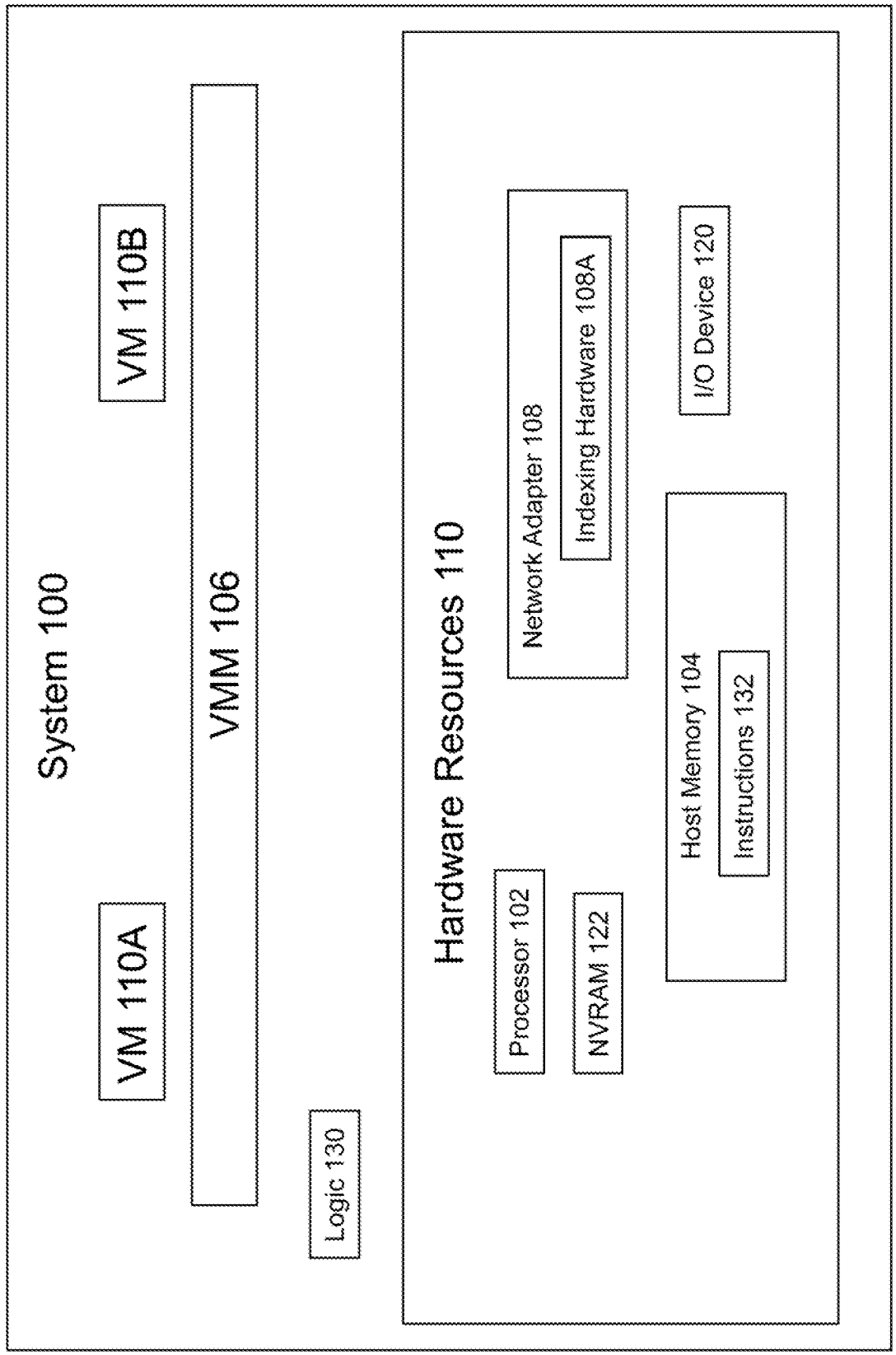
FIG. 1 is a block diagram that illustrates a computing system supporting a virtual environment according to an embodiment.

FIG. 1 illustrates a computer system 100 that supports a virtual environment. System 100 may comprise virtual machines 110A and 110B, virtual machine monitor 106, hardware resources 110, and logic 130. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in firmware, in machine-executable instructions 132 stored in a memory, such as memory 104, to perform these operations, or in various other components of system 100. Logic 130 may be used to perform various functions by various components as described herein.

System 100 may comprise a plurality of virtual machines 110A and 110B. While only two are shown, system 100 may comprise more or less virtual machines than those illustrated. Hardware resources 110 may be virtualized, meaning that a single physical hardware resource 110 may be partitioned into multiple virtual hardware resources to enable system 100 to use the single physical hardware resource 110 in multiple virtual machines 110A and 110B. Virtualization may be implemented using VMM 106. In an embodiment, VMM 106 comprises software that imposes a virtualization layer in system 100 in which hardware resources 110 may be virtualized for use by guest software running on virtual machines 110A and 110B.

Hardware resources 110 refer to physical hardware components associated with system 110 including, but not limited to, a processor 102, such as CPU (central processing unit), host memory 104, network adapter 108, I/O (input/output) device 120, and non-volatile random access memory (NVRAM) 122. Processor 102, host memory 104, network adapter 108, I/O device 120, and NVRAM 122 may be comprised in one or more integrated circuits or one or more circuit boards, such as, for example, a system motherboard 118. Alternatively, network adapter 108 and/or I/O device 120 may be comprised in one or more circuit cards that may be inserted into circuit card slots.

Processor 102 may comprise processing circuitry to carry out computational tasks of system 100. For example, processor 102 may include a CPU such as, for example, the Intel® Pentium® family of processors, or Intel® Core® family of processors, both commercially available from Intel® Corporation. Of course, alternatively, processor 102 may comprise another type of processor, such as, for example, a microprocessor that is manufactured and/or commercially available from Intel® Corporation, or a source other than Intel® Corporation, without departing from embodiments of the invention.

Host memory 104 may store machine-executable instructions 132 that are capable of being executed, and/or data capable of being accessed, operated upon, and/or manipulated by logic, such as logic 130, and/or processor, such as processor 102. The execution of program instructions 132 and/or the accessing, operation upon, and/or manipulation of this data by logic 130 for example, may result in, for example, system 100 and/or logic 130 carrying out some or all of the operations described herein. Host memory 104 may, for example, comprise read only, mass storage, random access computer-accessible memory, and/or one or more other types of machine-accessible memories. This may include, for example, DRAM (dynamic random access memory) or SRAM (static random access memory), but embodiments of the invention are not so limited.

Network adapter 108 as referred to herein relates to a device which may be coupled to a data transmission medium to transmit data to or receive data from other devices coupled to the data transmission medium. For example, network adapter 108 may be designed to transmit data to or receive data from devices coupled to a network such as a local area network. Such a network adapter may communicate with other devices according to any one of several data communication formats such as, for example, communication formats according to versions of IEEE Std. 802.3 (Ethernet), IEEE Std. 802.11, IEEE Std. 802.16, Universal Serial Bus, Firewire, asynchronous transfer mode (ATM), synchronous optical network (SONET), synchronous digital hierarchy (SDH), Internet Wide Area RDMA Protocol (iWARP), or InfiniBand standards.

Figure 5:
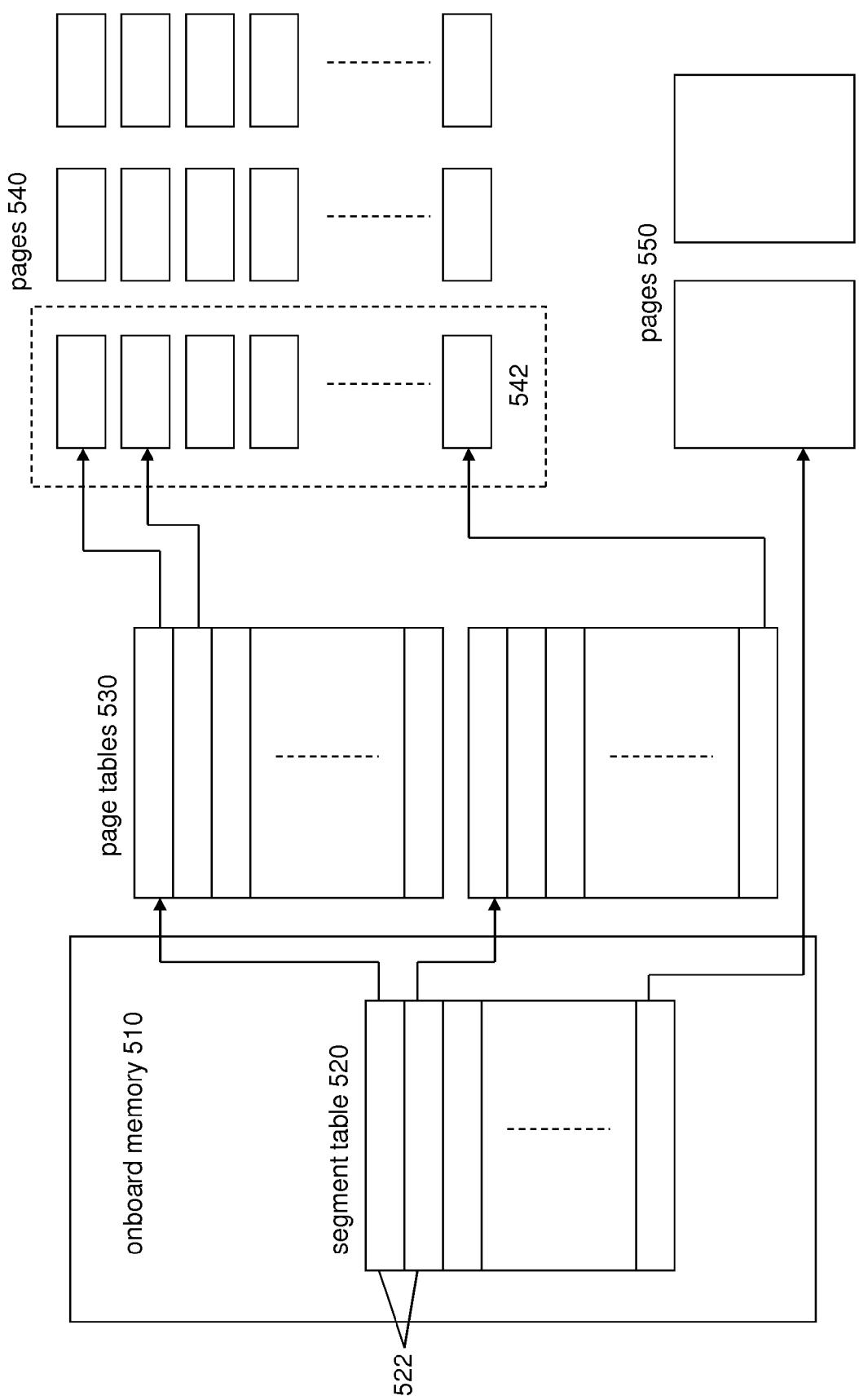
FIG. 5 illustrates an embodiment in which a network adapter includes an onboard memory.

Network adapter 108 may include onboard memory, but may also use host memory 104 to store RDMA context objects necessary to maintain state of many RDMA connections. FIG. 5 illustrates an embodiment of the present invention in which network adapter 108 includes onboard memory 510, which, in one embodiment, may be a 32 KB on-chip random access memory (RAM). Onboard memory 510 may be used for storing segment table 520, where each segment table entry may be used to store an address or other reference to page table 530 in host memory 104. Each page table entry may be used to store an address or other reference to one of 4 KB pages 540 in host memory 104 where context objects may be stored. Alternatively, one or more segment table entries may be used to store an address or other reference to one or more 2 MB pages 550 in host memory 104 where context objects may be stored. Other embodiments of the present invention may use any variety of memory hierarchies, pages or other memory region sizes, or any other aspects of memory or data structure organization, and any other arrangement for storing a portion of a data structure in onboard memory 510 and a portion in host memory 104.

Furthermore, network adapter 108A may include indexing hardware 108A to maintain assignments of RDMA context objects, as further described below. Indexing hardware 108A may include control and/or computation circuitry, storage elements, and/or any other structures to perform and/or facilitate the assignment, indexing, referencing, maintenance, and other functions related to RDMA context objects according to embodiments of the present invention.

I/O device 120 may represent any I/O or peripheral device and/or a controller or adapter for any such device. I/O device 120 may support I/O virtualization; for example, I/O device 120 may include or provide one or more physical functions (each, a "PF") that may be controlled by a VMM, each PF providing the capability to provide and one or more virtual functions (each, a "VF"). In an embodiment in which system 100 includes a PCI (Peripheral Component Interconnect) bus based on PCI Local Bus Specification, Revision 3.0, Feb. 3, 2004, I/O virtualization may be based on Single Root I/O Virtualization and Sharing Specification, Revision 1.0, Sep. 11, 2007. Other versions of these specifications and/or other specifications, as well as other protocols, may be used in embodiments of the invention.

A VMM may configure and manage the physical resources of I/O device 120 such that each of the VFs may be controlled and/or accessed directly by a VM. Therefore, a VF supported by I/O device 120 and assigned to a virtual machine may transfer data within, into, or out of system 100, under control of the virtual machine, without the intervention of a VMM. Furthermore, network adapter 108 may support RDMA capability such that one or more PFs or VFs of I/O device 120 may transfer data out of host memory 104 to a system other than system 100 or into host memory 104 from a system other than system 100, and/or between virtual machines in system 100 and virtual machines in systems other than system 100, without involving processor 102.

Figure 2:
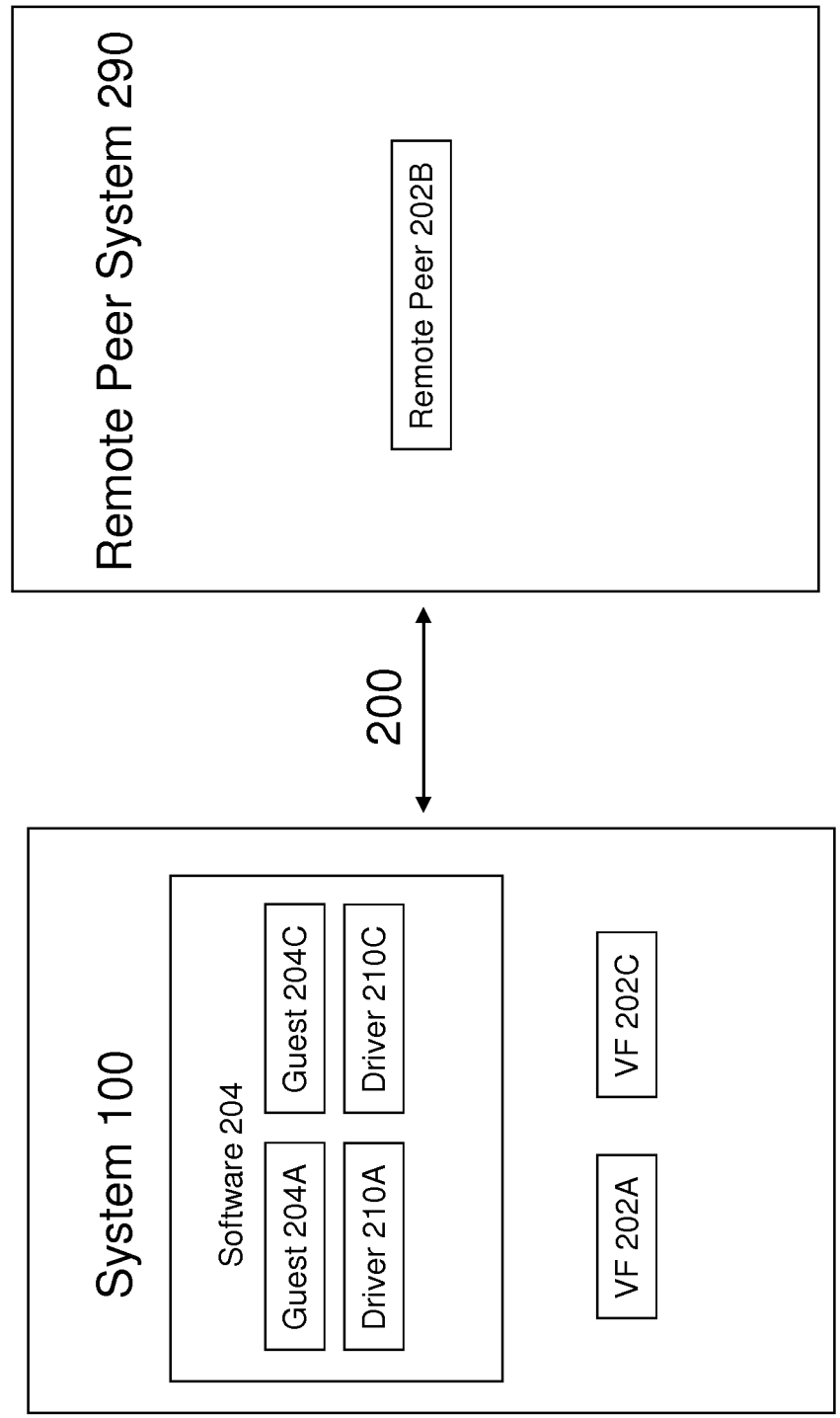
FIG. 2 illustrates an RDMA connection between a system and a remote peer according to an embodiment.

FIG. 2 illustrates RDMA connection 200 between system 100 and remote peer system 290 according to an embodiment of the invention. In this embodiment, VF 202A of I/O device 120 may be assigned to VM 110A. Accordingly, device driver 210A for VF 202A may reside in an area of host memory 104 allocated to VM 110A. Device driver 210A may communicate with network adapter 108 to establish RDMA connection 200 between system 100 and remote peer system 290, as further described below. RDMA connection 200 may be based on an RDMA protocol as set forth, for example, for example, by Infiniband™ Architecture (IBA), Volume 2, Release 1.2.1., October 2006; or Remote Direct Data Placement (RDDP), RFC 4296, December 2005. Other versions of these specifications and/or other specifications, as well as other protocols, may be used in embodiments of the invention.

Figure 3:
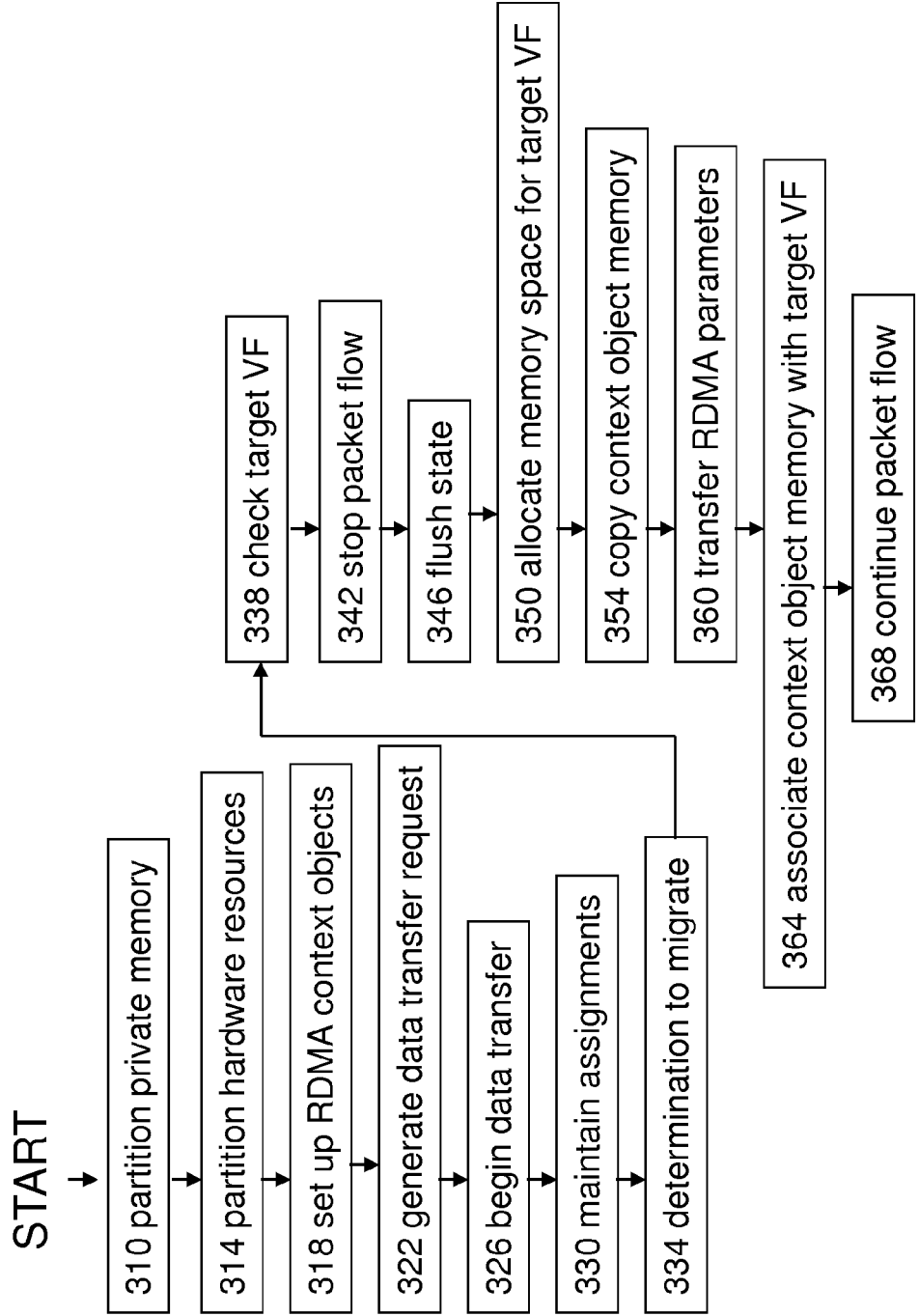
FIG. 3 illustrates a method for establishing and migrating an RDMA connection according to an embodiment.
Figure 4:
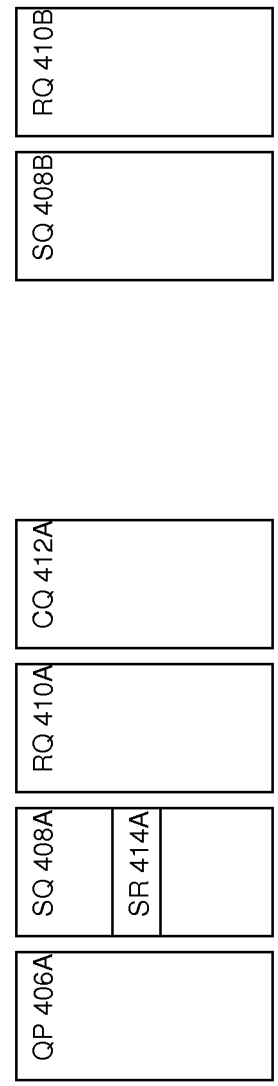
FIG. 4 illustrates partitioning RDMA context objects according to an embodiment.

FIG. 3 illustrates method 300 for establishing and migrating an RDMA connection according to an embodiment of the invention, and FIG. 4 illustrates partitioning of RDMA context objects according to an embodiment of the invention. The descriptions of FIG. 3 and FIG. 4 may be facilitated with references to elements of each other and of FIG. 1 and FIG. 2; however, embodiments of the present invention are not limited to those illustrated or described. Blocks of method 300 referred to as performed by software 204 may be performed by any software or any combination of software running, executing, or otherwise operating within system 100, such as guest software 204A (which, for example, may be application software and/or operating system software), other guest software, device driver 210A, a device driver for a PF of I/O device 120, VMM 106, or any other software or combination of software.

In block 310, onboard memory 510 may be partitioned such that the memory space for each RDMA context object supported by network adapter 108 is assigned to a particular VF of I/O device 120 or another particular VF in system 100. For example, as shown in FIG. 5, segment table entries 522 may be assigned to VF 202A, such that all RDMA context objects stored in pages 542 on host memory 104 belong to VF 202A. The assignments and/or information related to the assignments may be stored in NVRAM 122, which may be reprogrammed such that the assignments may be modified from time to time.

In block 314, hardware resources related to context objects may be partitioned among VFs by assigning one or more hardware resources to a particular VF. In addition or alternatively, one or more hardware resources may be designated to be shared between or among two or more VFs. Shared hardware resources may not be referenced by context objects, because all context objects are assigned to a single VF. The assignments and/or information related to the assignments may be stored in NVRAM 122, which may be reprogrammed such that the assignments may be modified from time to time.

In block 318, guest software 204A may perform one or more operations that result in network adapter 108 setting up RDMA context objects such as queue pair (QP) 406, send queue 408A, receive queue 410A, and completion queue 412A. QPs are set up such that each send queue has a corresponding receive queue on the remote peer. For example, QP 406 is set-up such that send queue 408A corresponds to receive queue 410B on remote peer 202B, and send queue 408B on remote peer 202B corresponds to receive queue 410A. Within embodiments of the present invention, any number of these context objects may be used for any number of RDMA connections, along with any number of other RDMA context objects.

In block 322, guest software 204A may initiate a data transfer between VF 202A and any memory, device, or other remote peer 202B within remote peer system 290 by generating a data transfer request. For example, guest software 204A may generate send request 414A, and post send request 414A to send queue 408A. Send request 414A may include information about the data transfer, such as a memory, memory-mapped I/O, or other address at which the data is to be fetched and/or stored, a request type (e.g., SEND), and the length of the data transfer. Any number of requests may be generated and posted.

In block 326, data transfer from VF 202A to remote peer 202B may begin, for example, by beginning the data transfer specified by the information in send request 414A.

In block 330, the assignment of all context objects to a particular VF is maintained, for example, by keeping an indexed list of context objects and their assignment to a particular VF. For example, in embodiments with shared and unshared resources, context objects related to resources that are not shared or partitioned start with an index of zero (e.g., each VF may have a QP with an index of zero). However, for context objects that relate to resources that are shared or partitioned, a combination of function, object type, and object index may be used to address host memory, where indexing hardware 108A performs a translation or other computation to maintain the appearance, to software 204, that zero-based indexing is being used. For example, a particular context object may appear to software 204 to have an index of zero, but the actual non-zero index may be determined by indexing hardware 108A based on a non-zero index number for a VF, where each non-zero index number for each VF may be based on the number of entries for one or more VFs. Block 330 is performed such that pages or other areas of host memory 104 used to store context objects are not shared between different VFs.

In block 334, a determination is made to migrate RDMA connection 200 from VF 202A to VF 202C. The migration may be desired based on application needs, load balancing, or any other reason.

VF 202C may be a VF of I/O device 120 or of any other I/O device within system 100 or another system, and/or may be assigned to VM 110A or any other VM within system 100 or another system. Although VF 202C is shown as within system 100, VF 202C may be in another system.

Furthermore, VF 202C may use network adapter 108 (e.g., VF 202A and VF 202C use different ports on the same adapter) or any other network adapter within system 100 or any other system, such that the migration of RDMA connection 200 may or may not include a migration from network adapter 108 to any other network adapter within system 100 or another system that operates according to an embodiment of the present invention.

In block 338, a check is performed on VF 202C and its network adapter to determine if sufficient resources are available for the migration.

In block 342, the flow of inbound and outbound packets over RDMA connection 200 is stopped. Inbound packets may be dropped, but the dropping of these packets may be detected and handled according to any known techniques. Outbound packets may be flushed to the network.

In block 346, any state related to VF 202A and/or VM 110A may be flushed from network adapter 108 to host memory 104.

In block 350, memory space may be allocated for context objects for VF 202C. In an embodiment wherein VF 202C is in system 100, the memory space may be allocated within host memory 104. In another embodiment, the memory space may be allocated within the host memory of another system.

In block 354, the contents of host memory 104 that is used for context objects previously assigned to VF 202A is copied, using CPU copy, DMA, RDMA, or any known technique, to the host memory space allocated for context objects for VF 202C. Therefore, the re-assignment of context objects from VF 202A to VF 202C may be transparent to guest software 204A or any other operating system, application software, or other software executing on behalf of a user of system 100 or remote peer system 290.

In block 360, parameters necessary or useful for RDMA connection 200, such as a local network address and network routing configuration information, may be transferred to device driver 210C for VF 202C.

In block 364, the host memory space allocated to VF 202C is associated with VF 202C.

In block 368, the flow of packets over RDMA connection 200, now between VF 202C and remote peer 202B, is continued.

Method 300 may include any additional operations desired, such as those involving known RDMA techniques. Furthermore, blocks illustrated in method 300 may be omitted and/or reordered within the scope of the present invention.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method comprising:
partitioning, by a virtual machine monitor running on a system, a plurality of remote direct memory access context objects among a plurality of virtual functions provided by a physical function of an input/output device in the system, including partitioning an onboard memory space of a network adapter into a plurality of regions, assigning a first region to a first of the plurality of virtual functions for storage of a portion of the plurality of remote direct memory access context objects, storing a segment table in a segment table space in the network adapter, storing at least a first remote direct memory access context object in the first memory region at a location referenced by a first entry in the segment table, and assigning the first entry to the first virtual function;
establishing, by a guest software running on the system, a remote direct memory access connection between the first of the plurality of virtual functions and a remote peer using the network adapter;
allocating a second region in the onboard memory space to a second of the plurality of virtual functions; and
migrating the remote direct memory access connection from the first of the plurality of virtual functions to the second of the plurality of virtual functions without disconnecting from the remote peer, the migrating including copying contents of the first region to the second region so that reassignment of the first virtual function context objects to the second virtual function is transparent to the guest software.

2. The method of claim 1, further comprising partitioning a plurality of hardware resources related to the plurality of remote direct memory access context objects among the plurality of virtual functions.

3. A system comprising:
a host memory;
an input/output device including a first of a plurality of virtual functions;
a processor to execute a virtual machine monitor to partition a plurality of remote direct memory access context objects among the plurality of virtual functions, including partitioning a space in an onboard memory of a network adapter into a plurality of regions, assigning a first region to the first of the plurality of virtual functions for storage of a portion of the plurality of remote direct memory access context objects, storing a segment table in a segment table space in the network adapter, storing at least a first remote direct memory access context object in the first memory region at a location referenced by a first entry in the segment table, and assigning the first entry to the first virtual function; and the network adapter to establish a remote direct memory access connection between the first virtual function and a remote peer, and to migrate the remote direct memory access connection from the first virtual function to a second virtual function without disconnecting from the first peer, the migrating to include copying contents of the first memory region to the second memory region so that reassignment of the first virtual function context objects to the second virtual function is transparent to a guest software.

4. The system of claim 3, further comprising a plurality of hardware resources related to the plurality of remote direct memory access context objects to be partitioned among the plurality of virtual functions.

5. An apparatus comprising:

a memory to store a segment table to be partitioned among a plurality of virtual functions, the segment table including a plurality of entries, each entry to refer to one of a plurality of locations in an onboard memory of a network adapter, each location to store at least one of a plurality of remote direct memory access context objects, the plurality of entries including a first entry to reference a first location of the plurality of locations in the onboard memory, the first location in a first of a plurality of regions in the onboard memory, the first region to store a first of the plurality of remote direct memory access context objects, the first entry to be assigned to a first virtual function of the plurality of virtual functions; and the network adapter, to establish a remote direct memory access connection between the first virtual function and a remote peer, and to migrate the remote direct memory access connection from the first virtual function to a second virtual function without disconnecting from the first peer, the migrating to include copying contents of the first memory region to a second memory region allocated to second virtual function context objects so that reassignment of the first virtual function context objects to the second virtual function is transparent to a guest software.

6. The apparatus of claim 5, further comprising a plurality of hardware resources related to the plurality of remote direct memory access context objects to be partitioned among the plurality of virtual functions.

* * * * *